E. HJARTARSON.
SLED DRIVING AND BRAKE MECHANISM.
APPLICATION FILED SEPT. 20, 1916.
1,234,027.
Patented July 17, 1917.
2 SHEETS—SHEET 2.
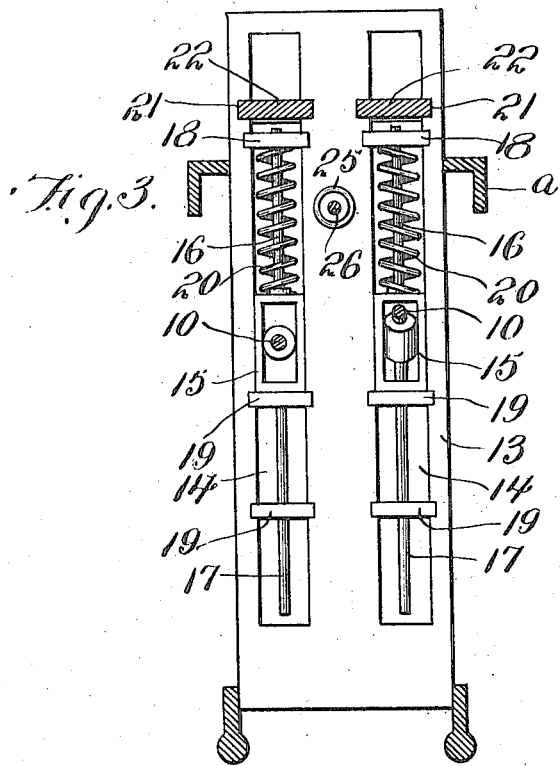
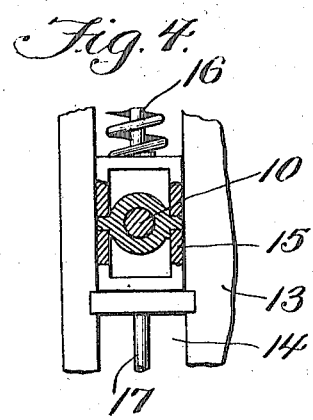
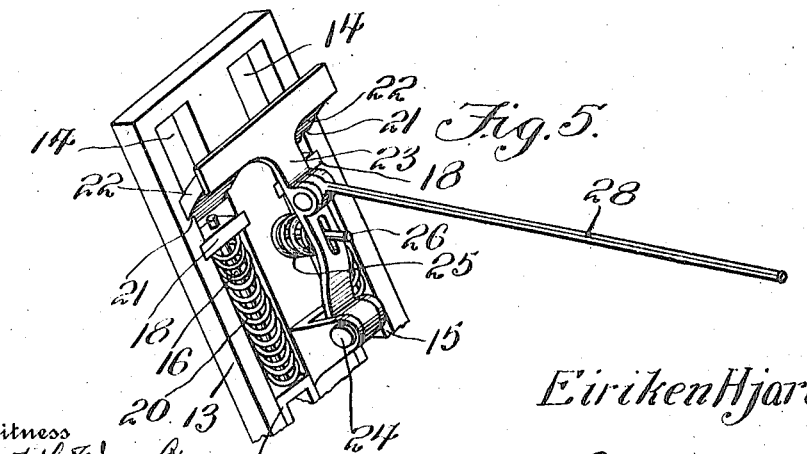
Inventor
Eiriken Hjartarson
By Victor J. Evans
Attorney
Witness
J. T. L. Wright
R. M. Smith

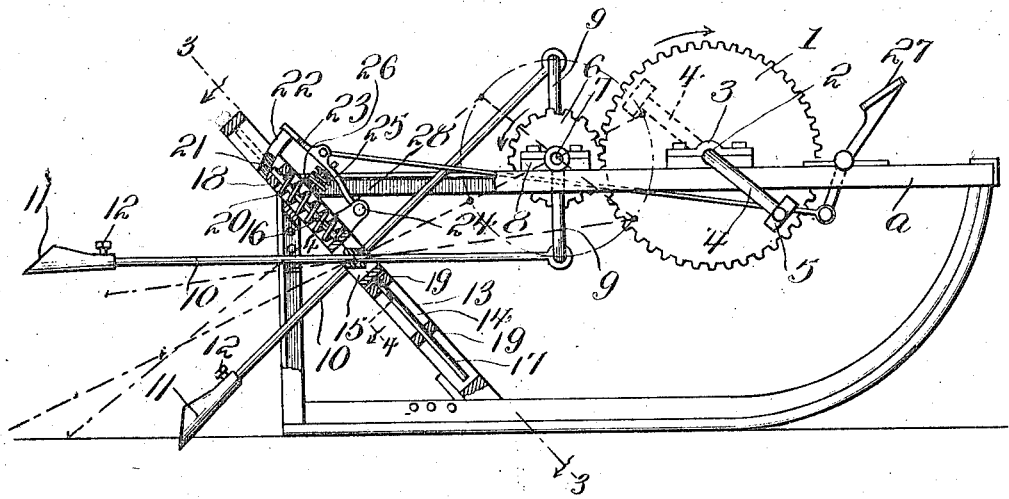

UNITED STATES PATENT OFFICE.

EIRIKEN HJARTARSON, OF CHICAGO, ILLINOIS.

SLED DRIVING AND BRAKE MECHANISM.

1,234,027. Specification of Letters Patent. Patented July 17, 1917.

Application filed September 20, 1916. Serial No. 121,327.

*To all whom it may concern:*

Be it known that I, EIRIKEN HJARTARSON, a subject of the King of Denmark, formerly residing at Winnipeg, in the Province of Manitoba, and Dominion of Canada, now residing at Chicago, county of Cook, and State of Illinois, have invented new and useful Improvements in Sled Driving and Brake Mechanism, of which the following is a specification.

This invention relates to sled driving and brake mechanism, the object in view being to provide simple and practical means mounted upon a sled, whereby the latter may be propelled rapidly over snow or ice with a minimum amount of physical effort or with an engine of comparatively small power where the latter is used.

The driving mechanism embodies a plurality of push bars which contact with the road surface and the object of the invention is to so guide and mount said push bars that they will have a long active stroke and a return stroke which is made with the push bars entirely out of contact with the road surface so as to cause no drag which would interfere with the progress of the sled.

A further object of the invention is to provide simple means whereby the push bars may be rendered temporarily inoperative and so held as to constitute brakes for bringing the sleigh or vehicle to a stop.

With the above and other objects in view, the invention consists in the novel construction, combination and arrangement, herein fully described, illustrated and claimed.

In the accompanying drawings:

Figure 1 is a side elevation partly in section of a sled embodying the present invention.

Fig. 2 is a plan view of the same.

Fig. 3 is a section on the line 3—3 of Fig. 1.

Fig. 4 is a section on the line 4—4 of Fig. 1.

Fig. 5 is a view illustrating the operation of the stop mechanism.

Referring to the drawings, *a* designates generally a sled. 1 designates a prime mover shown in the form of a spur gear wheel mounted on a shaft 2 journaled in bearings 3 on the frame of the sled *a*, the shaft being provided with crank arms 4 and pedals 5, the mechanism just described adapting the sled to be propelled by foot power. It will of course be understood however that any motive power may be utilized for driving the wheel 1 which in Fig. 1 revolves to the right or in a clockwise direction.

Meshing with the wheel 1 is another spur gear 6 which is mounted fast on a shaft 7 journaled in bearings 8 on the sled frame. The shaft 7 is provided at opposite sides of the wheel 6 with oppositely facing crank arms 9 on which are journaled the forward ends of a pair of push rods 10. Each push rod is provided at its rear extremity with a foot piece 11 which is detachably connected to the rear end portion of the respective push bar 10 by means indicated at 12 enabling new foot pieces to be substituted for the old ones when the latter become too far worn for further use.

13 designates an inclined and forwardly sloping guide which extends from the rear upper corner of the sled frame downwardly to a point between the ends of the bottom or runner of the sled. The guide 13 is formed with two guide-ways or slots 14 through which the push bars 10 operate. Slidable in each of the guide-ways 14 is a bearing block 15. Two of these blocks 15 are employed, one for each push bar 10. Each bearing block 15 is provided with upwardly and downwardly extending guide rods 16 and 17 respectively, the guide rod 16 passing through a cross guide 18 and the guide rod 17 passing through a cross guide 19, both guides 18 and 19 extending transversely across the respective slot or guide-ways 14.

Encircling each of the guide rods 16 is a coiled expansion spring 20 one extremity of each bears against the adjacent bearing block 15 while the other extremity thereof bears against the adjacent cross guide 18. The springs 20 act to press the bearing blocks 15 downwardly thereby holding the feet 11 of the push bars in yielding engagement with the road surface, permitting them to yield upwardly upon striking an obstruction while at all other times maintaining said feet in working contact and in engagement with the road surface.

The guide-ways 14 are extended above and beyond the upper extremities of the guide rods 16 and are formed with transverse guide-ways or notches 21 the same being adapted to receive stops 22 carried by an arm or lever 23 which is pivotally mounted at 24 on the sled frame. A coiled expansion spring 25 is interposed between the arm 23 and a fixed point 26 and acts to normally hold the stops 22 out of the path of the rods 16 so as to permit said rods to slide longitudinally to accommodate the corresponding movements of the bearing blocks 15. The stops 22 are moved into the path of the rods 16 so as to prevent the latter from operating by means of a manually controlled lever 27 such as a pedal lever which is connected by a link or connecting rod 28 with the lever or arm 23. The operator by depressing the lever 27 may thrust the stops 22 into the path of the rods 16. This locks the driving mechanism of the sled and enables the propelling feet 11 to act as brake shoes or drags which will bring the sled to a stop.

It will now be understood that the propelling elements or push bars 10 together with their feet 11 are used for propelling the machine and as brakes for bringing the machine to a stop when desired, thereby doing away with the necessity of employing separate and independent brake mechanism. While in use as driving mechanism, the push bars 12 are yieldingly held in engagement with the road surface by means of the springs 20. It will be noted that the crank shaft 7 in Fig. 1 revolves in an anti-clockwise direction and of course the crank arms 9 move in a corresponding direction. By reason of this movement of the crank arms taken in conjunction with the push bars and springs 20, the push bars have a full rearward stroke and immediately upon reaching the rear limit of their strokes, the feet 11 of the push bars are quickly elevated out of contact with the road surface and therefore do not form any drag which would impede the progress of the sled.

I claim:

1. The combination with a sled, of a crank shaft extending transversely thereof and having cranks extending in opposite directions from each other, propelling means for said crank shaft, push bars having their forward extremities attached to said crank arms, a guide through which said push bars operate, bearing blocks movable longitudinally of said guide and having the push bars slidable therethrough, guide rods extending from said bearing blocks, springs encircling said guide rods and acting to press said bearing blocks downwardly, and means coöperating with said guide rods to prevent movement thereof and of the bearing blocks.

2. The combination with a sled, of a crank shaft extending transversely thereof and having cranks extending in opposite directions from each other, propelling means for said crank shaft, push bars having their forward extremities attached to said crank arms, a guide through which said push bars operate, bearing blocks movable longitudinally of said guide and having the push bars slidable therethrough, guide rods extending from said bearing blocks, springs encircling said guide rods and acting to press said bearing blocks downwardly, and manually controlled stop mechanism embodying a means movable into and out of the path of said guide rods for holding and releasing the latter.

In testimony whereof I affix my signature.

EIRIKEN HJARTARSON.

Copies of this patent may be obtained for five cents each, by addressing the "Commissioner of Patents, Washington, D. C."